(12) United States Patent
Wu et al.

(10) Patent No.: US 8,389,061 B2
(45) Date of Patent: Mar. 5, 2013

(54) AQUEOUS EMULSION POLYMER FOR SCRUB RESISTANCE AND WET ADHESION

(75) Inventors: Wenjun Wu, Cary, NC (US); Albert R. Miner, II, Grayson, GA (US); Gerald A. Vandezande, Raleigh, NC (US)

(73) Assignee: Arkema Inc., King of Prussia, PA (US)

( * ) Notice: Subject to any disclaimer, the term of this patent is extended or adjusted under 35 U.S.C. 154(b) by 231 days.

(21) Appl. No.: 12/865,001

(22) PCT Filed: Feb. 1, 2008

(86) PCT No.: PCT/US2008/001423
§ 371 (c)(1),
(2), (4) Date: Jul. 28, 2010

(87) PCT Pub. No.: WO2009/096925
PCT Pub. Date: Aug. 6, 2009

(65) Prior Publication Data
US 2010/0330286 A1 Dec. 30, 2010

(51) Int. Cl.
*B05D 3/02* (2006.01)

(52) U.S. Cl. .................................. 427/385.5; 427/384
(58) Field of Classification Search .................... None
See application file for complete search history.

(56) References Cited

U.S. PATENT DOCUMENTS

| | | | |
|---|---|---|---|
| 3,652,480 A * | 3/1972 | Coker | 524/424 |
| 5,030,666 A * | 7/1991 | Kowalski et al. | 523/201 |
| 5,312,863 A * | 5/1994 | Van Rheenen et al. | 524/555 |
| 5,672,379 A * | 9/1997 | Schall et al. | 427/137 |
| 6,869,996 B1* | 3/2005 | Krajnik et al. | 524/521 |
| 2002/0058110 A1 | 5/2002 | Even | |
| 2002/0090459 A1 | 7/2002 | Even | |
| 2002/0160118 A1 | 10/2002 | Even et al. | |
| 2004/0102568 A1 | 5/2004 | Bridgewater et al. | |
| 2005/0106402 A1* | 5/2005 | Solomon et al. | 428/458 |
| 2005/0171274 A1 | 8/2005 | Even | |

* cited by examiner

*Primary Examiner* — Erma Cameron
(74) *Attorney, Agent, or Firm* — Lynn B. Morreale

(57) ABSTRACT

An aqueous emulsion polymer and a method for preparing the aqueous emulsion polymer, where the aqueous emulsion polymer is useful in an aqueous coating composition to provide good scrub resistance while maintaining wet adhesion of the aqueous coating composition.

22 Claims, 3 Drawing Sheets

AQUEOUS EMULSION POLYMER FOR SCRUB RESISTANCE AND WET ADHESION

CROSS-REFERENCE TO RELATED APPLICATIONS

This application is a national stage application under 35 U.S.C. §371 of PCT/US2008/001423, filed Feb. 1, 2008 which is hereby incorporated by reference.

TECHNICAL FIELD

Embodiments of the disclosure relate generally to an aqueous emulsion polymer and more particularly to an aqueous emulsion polymer useful in an aqueous coating composition for improving scrub resistance while maintaining wet adhesion of the aqueous coating composition.

BACKGROUND

Aqueous emulsion polymers, also called latexes or polymer dispersions, are known and used in both clear and pigmented coatings. For example, aqueous emulsion polymers are used in interior and exterior architectural coating compositions, general metal coating compositions, and even adhesive compositions, among others. Aqueous emulsion polymers can be formed by aqueous emulsion polymerization of ethylenically unsaturated monomers such as styrene and its derivatives; acrylic and methacrylic acids; alkyl acrylates, methacrylates, and hydroxyl-substituted derivatives; vinyl esters including vinyl acetate, vinyl isopropyl acetate, vinyl propionate, vinyl butyrate, vinyl pivalate, vinyl neo-nonanoate, 2-ethyl hexanoate, vinyl neo-decanoate, vinyl neoendecanoate, vinyl neo-dodecanoate and mixtures thereof; acrylonitrile; glycidyl acrylates and methacrylates, among others.

There are a large number of independent variables that can be manipulated in designing aqueous emulsion polymers. This renders the preparation of improved aqueous emulsion polymers technically challenging. The aqueous emulsion polymers used in aqueous coating compositions must be hard enough to resist physical and chemical forces, but at the same time, soft enough to form a continuous film. Film durability, water resistance, and chemical resistance are provided by hard polymers with glass transition temperatures (Tg) above ambient temperature. However, to be film-forming, these aqueous emulsion polymers must have a minimum filming temperature (MFT) at or below ambient temperature, to allow for fusion of the polymer particles into a continuous film.

While a variety of aqueous emulsion polymers have been described in the art, there is a continuing need for polymer dispersions containing emulsion polymers which provide a coating or film having excellent performance properties such as good scrub resistance, good wet adhesion, blocking resistance at elevated temperature, high gloss, water and chemical resistance, and excellent low temperature film formation, all with minimal volatile organic compound (VOC) levels.

SUMMARY

Embodiments of the present disclosure include an aqueous emulsion polymer and a method for preparing the aqueous emulsion polymer. The aqueous emulsion polymer can be included in an aqueous coating composition that can be useful in fields where mechanical and adhesion properties are desired, such as architectural coatings, industrial and automotive coatings, sealants, adhesives, paper coatings, inks, varnishes, cosmetics and the like. When included in the aqueous coating composition, the aqueous emulsion polymer of the present disclosure helps to improve scrub resistance while simultaneously maintaining wet adhesion properties of the aqueous coating composition as compared to aqueous coating compositions that do not include the aqueous emulsion polymer of the present disclosure.

For the various embodiments, the aqueous emulsion polymer is preparable by conducting an emulsion polymerization reaction with one or more ethylenically unsaturated nonionic monomers and from 0 to about 5% by weight, based on dry polymer weight, of ethylenically unsaturated acid monomers to form a copolymer, and conducting the emulsion polymerization reaction to a conversion level of at least 60% of monomers to the copolymer at a temperature selected from a temperature range of about 20° C. to about 85° C. and at a pH value having an initial value selected from a pH range of greater than about 7 to about 10, where the pH value and the temperature stay in their respective pH range and temperature range at least until the conversion level is attained. In an additional embodiment, the pH value can be maintained at the initial pH value at least until the conversion level is attained.

For the various embodiments, conducting the emulsion polymerization reaction can include allowing the pH value to increase from the initial value selected from the pH range by at least about one-half pH unit to about one pH unit during the emulsion polymerization reaction. Other fluctuations in the pH range are also possible.

In additional embodiments, the emulsion polymerization reaction can also be conducted at a temperature selected from a temperature range of about 50° C. to about 70° C. For the various embodiments, the initial value for the pH can also be selected from a pH range of about 8 to about 10. In addition, the aqueous emulsion polymer can also have a Tg of −50° C. to 20° C. Also, the aqueous emulsion polymer can have a gel content of at least 50% by weight of the aqueous emulsion polymer.

For additional embodiments, preparing the aqueous emulsion polymer with the emulsion polymerization reaction can include conducting the emulsion polymerization reaction without a chain transfer agent. In addition, conducting the emulsion polymerization reaction to the conversion level of at least 60% of monomers to the copolymer includes continuously adding a base to keep the pH value in the pH range at least until the conversion level is attainted. In one embodiment, a preferred base is ammonium hydroxide.

The embodiments of the present disclosure can also include conducting the emulsion polymerization reaction to form the copolymer discussed herein with from 0 to about 5% by weight, based on dry polymer weight, of an adhesion promoting monomer. In addition to including the adhesion promoting monomers, embodiments of the present disclosure can also include conducting the emulsion polymerization reaction to form the copolymer discussed herein with from 0 to about 10% by weight, based on dry polymer weight, of an acetoacetate containing monomer. For the various embodiments, the emulsion polymerization reaction can be conducted as a redox polymerization, where an oxidant is selected from the group consisting of t-butyl hydroperoxide, t-amyl hydroperoxide, and persulfate salts, and where a reductant is selected from the group consisting of sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, ascorbic acid, and isoascorbic acid.

The aqueous emulsion polymer can also be used to form an aqueous coating composition that can include a pigment volume concentration (PVC) of 0% to about 85%. The aqueous coating composition formed with the aqueous emulsion polymer can also contain less than 50 grams of a volatile organic compound per Liter of the aqueous coating composition. For the various embodiments, the aqueous coating composition does not include a coalescing aid, but yet can have a minimum film forming temperature for the aqueous emulsion polymer of 10° C. or less. The aqueous coating compositions formed with the aqueous emulsion polymer can be applied and dried on a substrate to provide a dried coating having an improved scrub resistance and wet adhesion as compared to comparable aqueous coating compositions not having the aqueous emulsion polymer of the present disclosure.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DEFINITIONS

As used herein, "a," "an," "the," "at least one," and "one or more" are used interchangeably. The terms "comprises" and variations thereof do not have a limiting meaning where these terms appear in the description and claims. Thus, for example, an aqueous coating composition that includes "a" volatile organic compound can be interpreted to mean that the volatile organic compound includes "one or more" volatile organic compounds.

The term "and/or" means one, one or more, or all of the listed elements

Also herein, the recitations of numerical ranges by endpoints include all numbers subsumed in that range (e.g., 1 to 5 includes 1, 1.5, 2, 2.75, 3, 3.80, 4, 5, etc.).

As used herein, the term "dry" means a substantial absence of liquids.

As used herein, the term "dry weight" refers to a weight of a dry material. For example, the solids content of the aqueous coating composition can be expressed as a dry weight, meaning that it is the weight of the aqueous coating composition remaining after essentially all volatile materials have been removed.

As used herein, "room temperature" refers to an ambient temperature of about 20° C. to about 25° C.

For the purposes of the present disclosure, the term "copolymer" means a polymer derived from more than one species of monomer.

As used herein, "Tg" is an abbreviation for glass transition temperature.

For the purposes of the present disclosure, the term "(meth)" indicates that the methyl substituted compound is included in the class of compounds modified by that term. For example, the term (meth)acrylic acid represents acrylic acid and methacrylic acid.

As used herein, "° C." is an abbreviation for degrees Celsius.

As used herein, "L" is an abbreviation for Liter.
As used herein, "mL" is an abbreviation for milliliter.
As used herein, "g" is an abbreviation for gram(s).
As used herein, "THF" is an abbreviation for tetrahyrofuran.

As used herein, "KTPP" is an abbreviation for potassium tri-polyphosphate.

As used herein, "alkyl" refers to a hydrocarbon group having the general formula $C_nH_{2n+1}$, where n is the number of carbon atoms.

As used herein, "PVC" is an abbreviation for pigment volume concentration, which can be calculated by the following formula: PVC (%)=(volume of pigment(s) (volume of pigment(s)+volume of dry polymer))×100.

A used herein, the term "scrub resistance" is defined and tested according to ASTM D-2486-79.

A used herein, the term "wet adhesion" is defined and tested according to ASTM D-6900-03.

As used herein, "MFFT" is an abbreviation for minimum film forming temperature, which is defined and tested according to ASTM D2354.

As used herein, the term "aqueous emulsion polymer" means a water dispersed polymer formed during a polymerization reaction carried out in an aqueous phase with monomers in an emulsified form (dispersed phase).

As used herein, "VOC" is an abbreviation for volatile organic compound, which is defined as any volatile compound of carbon, excluding methane, carbon monoxide, carbon dioxide, carbonic acid, metallic carbides or carbonates, ammonium carbonate, and exempt compounds according to the Environmental Protection Agency and under, for example, 40 Code of Federal Regulations §51.100(s).

As used herein, the term "coating composition" is interpreted to mean a liquid containing dissolved or suspended solids, as well as colloidal dispersions, suspensions, emulsions (such as an aqueous emulsion polymer) and latexes as they are conventionally defined, where the coating composition is applied to a substrate. The terms "colloidal dispersion" or "latex" mean a dispersion or suspension of particles in liquid, the particles being of a size greater than molecular scale, e.g., about 0.001 to about 0.5 micron. An emulsion generally contains particles of about 0.05 to 1.0 microns in liquid. A "suspension" generally contains particles of greater than 1.0 micron in liquid.

For the various embodiments, when the "coating composition" is dried, it is referred to as a "dried coating" or a "film."

DETAILED DESCRIPTION

Figure 1:
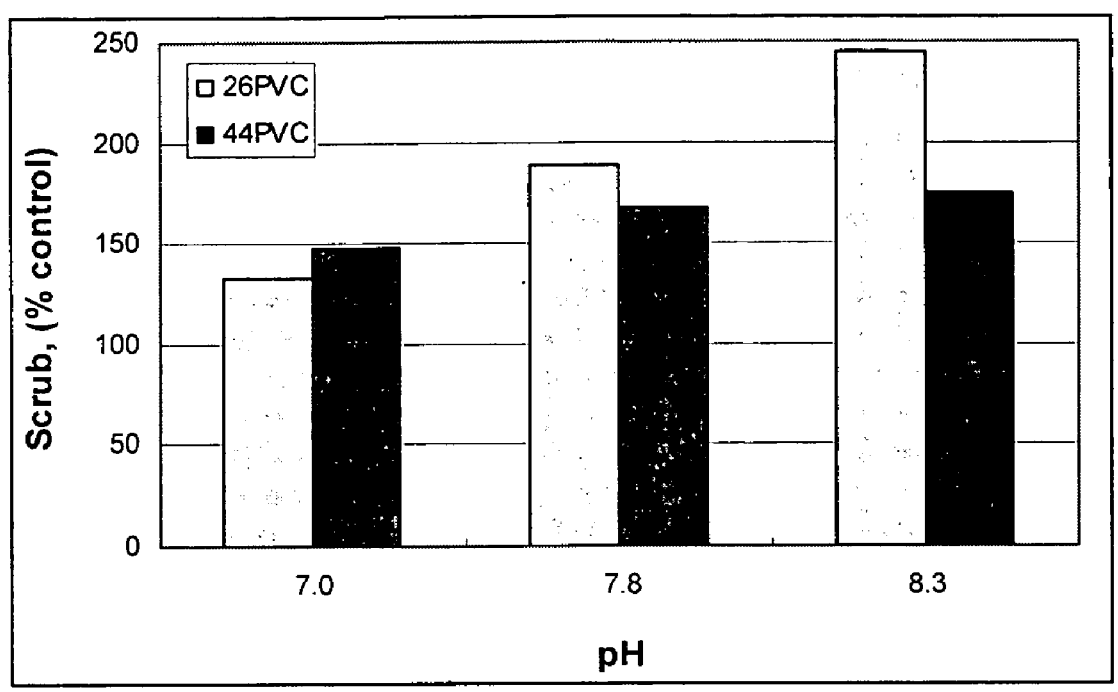
FIG. 1 is a graph illustrating scrub resistance of coating compositions having aqueous emulsion polymers formed a different pH values.

Present disclosure relates to an aqueous emulsion polymer prepared by an emulsion polymerization reaction in which a pH and a temperature of the reaction are each maintained within a predetermined limit of a selected value for each of these reaction parameters. For the various embodiments, the aqueous emulsion polymer prepared by such a process can be included in aqueous coating compositions to help improve the scrub resistance while maintaining the wet adhesion properties of the dried coating formed therefrom.

For the various embodiments, the aqueous emulsion polymer prepared according to the present disclosure includes a copolymer formed by conducting an emulsion polymerization reaction with one or more ethylenically unsaturated nonionic monomers and from 0 to about 5% by weight, based on dry polymer weight, of ethylenically unsaturated acid monomers. The emulsion polymerization reaction is conducted so as to obtain a conversion level of at least 60% of the monomers into the copolymer at a temperature selected from a temperature range of about 20° C. to about 85° C., where the temperature stays in the temperature range at least until the conversion level is attained.

In one embodiment, the temperature selected from the temperature range can be maintained in a predetermined range of plus or minus (±) about 5° C. at least until the conversion level is attained. In other words, the temperature at which the emulsion polymerization reaction occurs can deviate up to plus or minus (±) about 5° C. from the selected temperature as long as temperature remains in the temperature range of about 20° C. to about 85° C. Other predetermined ranges for maintaining the temperature selected from the temperature range are also possible, and include (±) about 4° C., (±) about 3° C., (±) about 2° C. and (±) about 1° C.

In addition to maintaining the selected temperature in the temperature range at least until the conversion level is attained, the emulsion polymerization reaction can be conducted a pH value having an initial value selected from a pH range of greater than about 7 to about 10, where the pH value stays in the pH range at least until the conversion level is attained. For the various embodiments, the pH value can also be maintained at the initial pH value in a predetermined range of plus or minus (±) about 0.5 pH units, at least until the conversion level is attained. In other words, the pH value of the emulsion polymerization reaction is maintained in the predetermined range of plus or minus (±) about 0.5 pH units from the initial value for the pH value. Other predetermined ranges for maintaining the initial value for the pH value are also possible, and include (±) 0.4 pH units, (±) 0.3 pH units, (±) 0.2 pH units and (±)0.1 pH units.

For the various embodiments, the pH value can deviate to a number of different pH values in the pH range during the emulsion polymerization reaction. As discussed herein for example, the pH value could both increase and decrease during the emulsion polymerization reaction. Alternatively, the pH value at which the emulsion polymerization reaction is conducted can only increase or only decrease in the pH range by a predetermined value. For example, the pH value can increase from the initial value by at least about one-half pH unit to about one pH unit during the emulsion polymerization reaction. As used herein, the terms "one-half pH unit" and "one pH unit" mean a pH unit of 0.5 or 1.0, respectively, which is added to pH value selected for and used in the emulsion polymerization reaction. So, when the initial value for the pH value is 7.8 the pH value can increase to a pH of at least about 8.3 (for the "one-half pH unit") to about 8.8 (for the "one pH unit") during the emulsion polymerization reaction. As appreciated, the pH value can increase, or decrease, by an amount other than one-half pH unit and one pH unit. These other values can include, but are not limited to, two and three-quarters pH unit (2.75), two and a half pH unit (2.5), two pH unit (2.0), one and three-quarters pH unit (1.75), one and a half pH unit (1.5), one and a quarter pH unit (1.25), and one-quarter pH unit (0.25), among others.

Surprisingly, it has been found that it is preferable to allow the pH value to increase, as opposed to decrease, during the emulsion polymerization reaction. When the pH value is allowed to increase the resulting aqueous emulsion polymers can provide for better scrub resistance while maintaining wet adhesion properties for an aqueous coating composition as compared to a comparable aqueous coating composition having aqueous emulsion polymers whose pH was allowed to decrease in the pH range during the emulsion polymerization reaction. In addition, it has also been surprisingly discovered that the aqueous emulsion polymer of the present disclosure can be formed without the use of a chain transfer agent, but yet still provides for improved scrub resistance and maintained wet adhesion properties when used in an aqueous coating composition.

For the various embodiments, maintaining the pH value of the emulsion polymerization reaction in the pH range at least until the conversion level is attained can be accomplished by a continuous addition of a base to the emulsion polymerization reaction. Surprisingly, a limited number of bases are suitable to both maintain the pH value in the pH range and to allow the polymerization reaction to occur at the temperature selected from the temperature range at least until the conversion level is attained. For example, ammonium hydroxide (e.g., a 28% by weight ammonium hydroxide solution) has been found to be a suitable base for both maintaining the pH value in the pH range and allowing the polymerization reaction of the present disclosure to occur. In contrast, other bases that are known to be used in emulsion polymerizations inhibit and/or prevent the emulsion polymerization of the present disclosure, especially at pH values greater than about 8 when used along or in combination with other bases. An example of a base that inhibits and/or prevents the emulsion polymerization, especially at pH values greater than about 8, is sodium hydroxide.

For the various embodiments, an addition rate at which the base is continuously added to maintain the pH of the emulsion polymerization reaction as discussed herein can be based on a number of different factors associated with the emulsion polymerization reaction. For example, given the concentration of the base the addition rate can be based on the amount of acid being added to the emulsion polymerization reaction by the monomers used in forming the copolymers. In addition, a pH measurement of the emulsion polymerization reaction can be used to control the addition rate at which the base is continuously added through process control techniques, as are known. Buffering techniques using known buffers, including ammonium based buffers, can also be used to maintain the pH of the emulsion polymerization reaction as discussed herein.

For the various embodiments, the continuous addition of the base can occur during the addition of the monomer feed to the emulsion polymerization reaction. In other words, the continuous addition of the base occurs only during the monomer feed to the emulsion polymerization reaction. So, the continuous addition of the base can start at the beginning of the monomer feed to the emulsion polymerization reaction and stop at the end of the monomer feed to the emulsion polymerization reaction. In an additional embodiment, the continuous addition of the base can continue after the end of the monomer feed, including through one or more post reaction processes.

For the various embodiments, it is also possible to conduct the emulsion polymerization reaction at the selected temperature and pH value to obtain a conversion level that is different from at least 60% of the monomers into the copolymer. For example, it is possible to conduct the emulsion polymerization reaction at the selected temperature and pH value to obtain a conversion level of at least 70% of the monomers into the copolymer. Other values for the conversion level include at least 80%, at least 90%, or at least 95% of the monomers converted into the copolymer.

Embodiments the aqueous emulsion polymer of the present disclosure can further include copolymers having one or more ethylenically unsaturated nonionic monomers, from 0 to about 5% by weight, based on dry polymer weight, of ethylenically unsaturated acid monomers, from 0 to about 5% by weight, based on dry polymer weight, of an adhesion promoting monomer, and/or from 0 to about 10% by weight, based on dry polymer weight, of an acetoacetate containing monomer. Other combinations of the ethylenically unsaturated nonionic monomers, the ethylenically unsaturated acid monomers, the adhesion promoting monomer and the acetoacetate containing monomers are also possible in forming the aqueous emulsion polymer of the present disclosure. The monomers may be added neat or as an emulsion in water during the emulsion polymerization reaction.

The present disclosure further allows for an aqueous coating composition that includes the aqueous emulsion polymer of the present disclosure. Among other properties, the aqueous coating composition having the aqueous emulsion polymer displays improved scrub resistance while maintaining wet adhesion properties once the aqueous coating composition has formed a dried coating after being applied to the substrate and allowed to dry.

For the various embodiments, the aqueous emulsion polymer includes one or more copolymerized ethylenically unsaturated nonionic monomers up to 100% by weight, based on dry polymer weight, of the aqueous emulsion polymer. In other words, the aqueous emulsion polymer can be copolymers formed from the one or more ethylenically unsaturated nonionic monomers, without the ethylenically unsaturated acid monomers, the adhesion promoting monomer and/or the acetoacetate containing monomers. By "nonionic monomer" herein is meant that the copolymerized monomer residue does not bear an ionic charge at a pH of 1-14.

Suitable examples of ethylenically unsaturated nonionic monomers used in forming the copolymers include, but are not limited to, ethylene, styrene, or alkyl-substituted styrene; vinyl esters such as vinyl acetate, vinyl isopryl acetate, vinyl propionate, vinyl butyrate, vinyl pivalate, vinyl neononanoate, 2-ethyl hexanoate, vinyl neo-decanoate, vinyl neoendecanoate, vinyl neo-dodecanoate and mixtures thereof; vinyl halides such as vinyl chloride and vinylidene chloride; (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; butadiene; propylene, α-olefins such as 1-decene; vinyl butyrate and other vinyl esters; and monoethylennically unsaturated (meth) acrylic monomers. Examples of monoethylennically unsaturated (meth)acrylic monomers include esters and nitriles of (meth)acrylic acid, such as, for example, $C_1$ to $C_{24}$ alkyl esters of (meth)acrylic acid such as ethyl(meth)acrylate, 2-ethylhexyl(meth)acrylate, and stearyl(meth)acrylate; hydrophobic branched mono vinyl esters; monomers with hydrolyzable Si-organic bonds that include vinyl silanes, methacryloyloxypropyltrimethoxysilane, methacryloyloxypropyltriethoxysilane, methacryloyloxypropyltripropoxysilane, vinyltrimethoxylsilane, vinyl tris(2-methoxyethoxy silane), and vinyl triisopropoxysilane. The use of the term "(meth)" followed by another term such as acrylate, acrylonitrile, or acrylamide refers to acrylate, acrylonitrile, or acrylamide and methacrylate, methacrylonitrile, and methacrylamide, respectively.

In additional embodiments, the aqueous emulsion polymer can include copolymers having from 0 to about 5% by weight, based on dry polymer weight, of ethylenically unsaturated acid monomers. Suitable examples of ethylenically unsaturated acid monomers include, but are not limited to, carboxylic acid-containing monomers and anhydride monomers such as (meth)acrylic acid, crotonic acid, itaconic acid, fumaric acid, maleic acid, monomethyl itaconate, monomethyl fumarate, monobutyl fumarate, and maleic anhydride; sulfur acid containing monomers such as sulfoethyl(meth)acrylate, 2-acrylamido-2-methylpropane sulfonic acid, vinyl sulfonic acid, styrene sulfonic acid, sulfophthalic acid, amino or diamino alkyl or aryl sulfonic acids including 1,4-butanediol-2-sulfonic acid; phosphorus acid containing monomers including phosphoalkyl(meth)acrylate. Specific examples of suitable monoethylenically unsaturated acid monomers include acrylic acid, methacrylic acid, and itaconic acid.

In additional embodiments, the aqueous emulsion polymer can include copolymers having from 0 to about 5% by weight, based on dry polymer weight, of adhesion promoting monomers. Suitable examples of adhesion promoting monomers include, but are not limited to, free-radically polymerizable nitrogen-containing compounds that have at least one of an amino group, an ureido group, a urea group, a thiourea group, and an N-heterocyclic group. Examples of adhesion monomers include ureido (meth)acrylates, amine containing (meth)acrylates such as aminoalkyl (meth)acrylate, and N,N-dialkyl aminoalkyl(meth)acrylate); propyleneimine, (meth) acrylates with at least one of urea and thiourea in the side chains. Specific examples of suitable adhesion promoting monomers include ethyleneurea methacrylate and methacrylamido ethyleneurea, and combinations thereof.

In additional embodiments, the aqueous emulsion polymer can include copolymers having from 0 to about 10% by weight, based on dry polymer weight, of an acetoacetate containing monomer. Suitable examples of acetoacetate containing monomers include, but are not limited to, acetoacetoxyethyl acrylate, acetoacetoxypropyl methacrylate, allyl acetoacetate, acetoacetoxybutyl methacrylate, 2,3-di(acetoacetoxy)propyl methacrylate and the like. In general, polymerizable hydroxy functional monomers can be converted to the corresponding acetoacetate by reaction with diketene or other suitable acetoacetylating agent.

A variety of polymerization techniques can be used for the emulsion polymerization reaction in preparing the aqueous emulsion polymer of the present disclosure. For the various embodiments, no chain transfer agent is used during the polymerization.

For the polymerization reactions, the monomer mixture may be added in one or more additions or continuously, linearly or not, over the reaction period, or combinations thereof. The copolymers formed during the emulsion polymerization reaction are generally prepared as particles, where the particles can be formed from seed particle as are known. For the various embodiments, the particles may be structured or unstructured.

In one embodiment, the aqueous emulsion polymer can be prepared as unstructured particles in a redox reaction process. The redox reaction process includes an oxidant and a reductant along with appropriate heating as discussed herein. In various embodiments, the redox process occurs in an aqueous emulsion to prepare the aqueous emulsion polymer. Conventional surfactants can be used during the aqueous emulsion, such as anionic and/or nonionic emulsifiers such as alkali or ammonium alkyl sulfates, alkyl sulfonic acids, and fatty acids, and oxyethylated alkyl phenols, among others. The amount of surfactant used is usually 0.1 to 6% by weight based on the weight of total monomers.

Suitable oxidants for the redox reaction process can include one or more free radical initiators such as hydrogen peroxide, persulfate salts, t-alkyl hydroperoxide, t-alkyl peroxide or t-alkyl perester, sodium perborate, perphosphoric acid and salts thereof, and mixture thereof, which can be used at a level of 0.01 to 3.0% by weight, based on dry polymer weight. Specific oxidants include persulfate salts, t-butyl hydroperoxide, and t-amyl hydroperoxide.

Suitable reductants can include, for example, sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, ascorbic acid, isoascorbic acid, tartaric acid, 2-hydroxy-2-sulfinatoacetic acid, and mixtures thereof, which can be used at a level of 0.01 to 3.0% by weight, based on dry polymer weight. The oxidant and reductant can be added to the reaction mixture in separate streams concurrently with the monomer mixture.

A specific example of a preferred pair of oxidant and reductant includes, but is not limited to, t-butyl hydroperoxide for the oxidant and sodium metabisulfite for the reductant. Another preferred pair of oxidant and reductant includes, but is not limited to, t-butyl hydroperoxide for the oxidant and isoascorbic acid for the reductant. In addition, the use of sodium persulfate for the oxidant and sodium metabisulfite for the reductant is also a preferred pair of oxidant and reductant for use in the present disclosure.

In another embodiment of the present disclosure, the particles can be structured. For example, the aqueous dispersion can contain copolymer particles made up of at least two copolymers formed in a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles.

These mutually incompatible copolymers may be present in the following morphological configurations, for example, core/shell, core/shell particles with shell phases incompletely encapsulating the core, core/shell particles with a multiplicity of cores, interpenetrating network particles, and the like. In these cases, the majority of the surface area of the copolymer particle will be occupied by at least one outer phase and the interior of the copolymer particle will be occupied by at least one inner phase. The mutual incompatibility of the two copolymer compositions may be determined in various ways known in the art.

Each of the stages of the multi-staged emulsion polymerization reaction may contain the same monomers, surfactants, redox initiation system, as disclosed herein for the aqueous emulsion polymer. In the case of a multi-staged aqueous emulsion polymer, the Tg for the purpose of this invention is to be calculated by the Fox equation as detailed herein using the overall composition of the aqueous emulsion polymer without regard for the number of stages or phases therein. Similarly, compositional quantities for a multi-staged aqueous emulsion polymer such as, for example, the amount of nonionic monomer and acid monomer can be determined from the overall composition of the aqueous emulsion polymer without regard for the number of stages or phases therein.

Conventional polymerization surfactant may be used in the emulsion polymerization reaction of the present disclosure. Useful surfactants include, but are not limited to, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols, among others. Amounts of surfactant used can range from 0.1% to 6% by weight, based on the weight of monomer. As appreciated, the type and amount of surfactant used in the emulsion polymerization reaction will depend on the specific composition, reaction conditions, and the desired final particle size, as is known in the art.

For the various embodiments, the emulsion polymerization reaction temperature stays in the temperature range of about 20° C. to about 85° C. at least until the conversion level is attained. In additional embodiments, the emulsion polymerization reaction temperature stays in the temperature range of about 50° C. to about 70° C. at least until the conversion level is attained. As discussed herein, the temperature at which the emulsion polymerization reaction is conducted can deviate up to 5° C. from the selected temperature in the temperature range at least until the conversion level is attained.

For the various embodiments, once the conversion level is attained, either one or both of the pH value and/or the temperature can be changed to a value outside of the respective ranges. For example, once the conversion level is attained the temperature can be increased to a value of less than about 100° C. Similarly, once the conversion level is attained the pH value can be changed, or allowed to change, to a pH value outside of the pH range. Examples of these pH values outside the pH range include those in the acidic pH range.

In addition to changing the temperature and/or the pH value once the conversion level is attained it is also possible to add additional initiators to further drive the emulsion polymerization reaction to conversion levels of 99% or higher.

The glass transition temperature ("Tg") of the aqueous emulsion polymer can be from −50° C. to 20° C., where the monomers and amounts of the monomers can be selected to achieve the desired polymer Tg value and/or range. In an additional embodiment, the Tg of the aqueous emulsion polymer can be from −15° C. to 15° C. Tgs used herein are those calculated by using the Fox equation (T. G. Fox, Bull. Am. Physics Soc., Volume 1, Issue No. 3, page 123 (1956)). Tg values for monomers and/or homopolymers may be found, for example, in "Polymer Handbook", edited by J. Brandrup and E. H. Immergut, Interscience Publishers.

The aqueous emulsion polymer can have a volume average particle diameter from 50 to 350 nanometers. Particle sizes herein are those determined using a Microtrac UPA150 or Nanotrac UPA150 manufactured by Microtrac. Also contemplated are multimodal particle size emulsion polymers, where two or more distinct particle sizes or very broad distributions are possible.

The aqueous emulsion polymers of the present disclosure also include a relatively high level of gel content of at least 50% by weight of the aqueous emulsion polymer. The gel content can on occasion also be 65% or higher. Surprisingly, this relatively high level of gel content (e.g., 65% or higher) does not appear to materially impair the improved scrub resistance and/or quality of the dried coating formed with the aqueous emulsion polymer. As used herein, "gel content" can be defined as a percentage of an insoluble amount of the dried polymer in THF over the total dry weight of the aqueous emulsion polymer.

For the various embodiments, aqueous coating compositions that include the aqueous emulsion polymer can include a pigment and/or an extender, among other components. As used herein, the term "pigment" includes a particulate inorganic material that is capable of materially contributing to the opacity or hiding capability of a coating. Such materials typically have a refractive index of greater than 1.8 and include, for example, titanium dioxide, zinc oxide, zinc sulfide, and the like. As used herein, the term "extender" includes a particulate inorganic material having a refractive index of less than or equal to 1.8 and greater than 1.3 and includes, for example, calcium carbonate, clay, calcium sulfate, aluminosilicates, silicates, zeolites, and diatomaceous earth.

The aqueous coating composition of the present disclosure may also contain solid or voided polymer particles. Examples of such solid and voided polymer particles can include those having a Tg of greater than 30° C. and/or those not including, as polymerized units, phosphate monomers. For the purposes of PVC calculations discussed herein, solid and/or voided polymer particles are classified as extenders.

For the various embodiments, the aqueous coating composition of the present disclosure can include a PVC of 0% to 85%. This range of PVC percentage for the aqueous coating composition encompasses a variety of coating compositions that include, but are not limited to, clear coatings, flat coatings, satin coatings, semi-gloss coatings, gloss coatings, primers, textured coatings, and the like.

For the various embodiments, aqueous coating compositions that include the aqueous emulsion polymer can be prepared by a number of different techniques. For example, when the aqueous coating composition is pigmented, at least one pigment can be dispersed in an aqueous medium under high shear using a high speed mixer, such as a COWLES mixer or, in the alternative, at least one predispersed pigment may be used. Other techniques are also possible.

The aqueous coating composition may also contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, UV absorbers such as benzophenone, substituted benzophenones, and substituted acetophenones, colorants, waxes, and/or anti-oxidants. The aqueous coating composition may contain up to 50%, by weight based on the total dry weight of the polymer, of an emulsion polymer different from the aqueous emulsion polymer of the present disclosure, including a film-forming and/or a non-film-forming emulsion polymers.

The aqueous coating compositions of the present disclosure can also include a volatile organic compound (VOC). Volatile organic compounds are added to aqueous coating compositions to help improve the film properties or to aid in coatings application properties. Examples are glycol ethers, organic esters, aromatic compounds, ethylene and propylene glycol, and aliphatic hydrocarbons.

For the various embodiments, the aqueous coating composition can contain less than 50 g/L of a VOC. Embodiments for the aqueous coating composition can also contains less than 25 g/L VOC, and even down to aqueous coating compositions that contain 0 g/L VOC.

For the various embodiments, the aqueous coating composition of the present disclosure does not include a coalescing aid. A coalescing aid is a compound that can be added to a water-borne emulsion polymer, paint or aqueous coating composition to help reduce the minimum film forming temperature (MFFT) of the emulsion polymer, paint or coating by at least 1° C. As used herein, the MFFT can be measured using ASTM test method D2354.

The solids content of the aqueous coating composition may be from 25% to 60% by volume. The viscosity of the aqueous coating composition may be from 80 Krebs Units (KU) to 140 KU as measured using a Stormer viscometer at room temperature. As appreciated, the viscosity of the aqueous polymeric composition can be modified to meet the requirements of different coating application methods.

Conventional coatings application methods such as, for example, brushing, rolling, and spraying methods such as, for example, air-atomized spray, air-assisted spray, airless spray, high volume low pressure spray, and air-assisted airless spray may be used in forming a coating of the aqueous coating composition of the present disclosure. The aqueous coating composition may be advantageously applied to substrates such as, for example, plastic, wood, metal, primed surfaces, previously painted surfaces, weathered painted surfaces and cementations substrates. Drying is typically allowed to proceed under ambient conditions such as, for example, at 0° C. to 35° C., which includes room temperature as defined herein.

EXAMPLES

The disclosure is further described in the following examples. The examples are merely illustrative and do not in any way limit the scope of the disclosure as described and claimed.

The emulsion polymerization reactions were run in a semi-continuous fashion, where all or the bulk of the monomers were added over a set time interval into the reactor during polymerization. A seed latex was used for better control of particle size and/or particle size distribution.

Feeding rates of monomer emulsion and initiator were computer-controlled so that exact amounts were delivered into the polymerization reactor. The temperature of the reactor was controlled with a water bath under thermostatic control. Reactor contents were agitated at a sufficient speed to provide adequate mixing of reaction components.

The following abbreviations are used herein—MMA: methyl methacrylate; BA: n-butyl acrylate; MAA: methacrylic acid; AA: acrylic acid; STY: Styrene.

The polymerization reactions of the following examples took place is a three-liter, jacketed glass reactor equipped with dual impellers, reflux condensers, stainless steel feed lines and a pH probe coupled to a pH meter. Values from the pH meter were taken every 15 minutes during the polymerization reactions.

All polymerizations were conducted in deionized water (DI water).

Example 1 (E1)

BA/MMA/ROHAMERE/AA Aqueous Emulsion Polymer Formed at a Maintained pH 17.5 g of a polystyrene seed latex (40% solids, particle diameter about 40 nanometer) and 500 g DI water were added to the reactor. The reactor was heated to 65° C. The monomers (685 g BA, 422.3 g MMA, 22.6 g ROHAMERE 6852 (Degussa), 11.5 g AA) were combined with 295 g DI water and 50.8 g RHODACAL A-246L (Rhodia) and emulsified in the reactor under agitation.

An oxidizer solution was prepared by mixing 7.6 g t-butyl hydroperoxide (tBHP) in 50 g DI water while a reducer solution was prepared by dissolving 5.1 g sodium metabisulfite (SMBS) into 80.5 g DI water. Commencing simultaneously, monomer preemulsion, tBHP and SMBS solutions and 16.2 g of a 28% (by weight) ammonium hydroxide solution were added to the reactor by separate feed streams. The feed time for monomers and 28% ammonium hydroxide solution was 210 minutes, while the feed time for oxidizer and reducer solutions was 10 minutes longer. The temperature of the polymerization reaction was controlled at 65° C. A pH of about 8 was maintained during the feed time for the monomers to the reactor. After adding the oxidizer and reducer solution feeds, the reactor was held at 65° C. for 30 minutes.

To further reduce the amount of residual monomers, 3.6 g t-BHP and 2.6 g SMBS in aqueous solutions were fed to the reactor over 60 minutes. The pH of the resulting latex was adjusted to a value in a range of about 8.5 to about 9.5 with the 28% ammonium hydroxide solution. The solid content of the resulting latex was about 50% by weight.

Comparative Example 1 (CE1)

BA/MMA/ROHAMERE/AA Aqueous Emulsion Polymer Formed with pH Drift

The polymerization recipe and process is similar to that of E1, except 2.3 g sodium carbonate was also added with the seed latex and water to the reactor, and the oxidizer solution further included 0.4 g sodium bicarbonate.

Commencing simultaneously, monomer preemulsion, oxidizer and reducer solutions were fed to the reactor over 210 minutes and 220 minutes, respectively. The temperature was controlled at 65° C. The pH of the reactor content exhibits a downward drift from about 10.6 to about 4.8 during the course of the polymerization reaction. After adding the oxidizer and reducer feeds, the reactor was held at 65° C. for 30 minutes.

To further reduce the amount of residual monomers, 3.6 g t-BHP and 2.6 g SMBS in aqueous solutions were fed over 60 minutes. The pH of the resulting latex was adjusted to a value in a range of about 8.5 to about 9.5 with 28% ammonium hydroxide. The solid content of the latex was about 50% by weight.

Example E2.1

BA/MMA/ROHAMERE/MAA Aqueous Emulsion Polymer Formed at a Maintained pH 17.5 g of a polystyrene seed latex (40% solids, particle diameter about 40 nanometer) and 500 g DI water were added to the reactor. The reactor was heated to 65° C. The monomers (687.1 g BA, 431.8 g MMA, 22.6 g ROHAMERE 6852 (Degussa), 5.8 g MAA) were combined with 295 g DI water and 50.8 g RHODACAL A-246L (Rhodia) and emulsified in the reactor under agitation.

An oxidizer solution was prepared by mixing 7.6 g t-butyl hydroperoxide (tBHP) in 50 g DI water while a reducer solution was prepared by dissolving 5.1 g sodium metabisulfite (SMBS) into 80.5 g DI water. Commencing simultaneously, monomer preemulsion, tBHP and SMBS solutions and 7.2 g of a 28% ammonium hydroxide solution were added to the reactor by separate feed streams. The feed time for monomers and 28% ammonium hydroxide solution was 210 minutes, while the feed time for oxidizer and reducer solutions was 10 minutes longer. The temperature of the polymerization reaction was controlled at 65° C. A pH of about 8.3 was maintained during the feed time for the monomers to the reactor. After adding the oxidizer and reducer solution feeds, the reactor was held at 65° C. for 30 minutes.

To further reduce the amount of residual monomers, 3.6 g t-BHP and 2.6 g SMBS in aqueous solutions were fed to the reactor over 60 minutes. The pH of the resulting latex was adjusted to a value in a range of about 8.5 to about 9.5 with the 28% ammonium hydroxide solution. The solid content of the resulting latex was about 50%.

Example E2.2

The polymerization recipe and process was similar to that of E2, except that 5.1 g of 28% ammonium hydroxide solution was added to the reactor in a separate feed stream concurrent with the monomer feed. A pH of about 7.8 was maintained during the feed time for the monomers to the reactor.

Example E2.3

The polymerization recipe and process was similar to that of E2, except that 4.1 g of 28% ammonium hydroxide solution was added to the reactor in a separate feed stream concurrent with the monomer feed. A pH of about 7.0 was maintained during the feed time for the monomers to the reactor.

Example E2.4

The polymerization recipe and process was similar to that of E2.2, except that the reaction temperature was controlled at 85° C.

Comparative Example CE2.1.1

The polymerization recipe and process was similar to that of E2.1, except that 16.8 g of sodium hydroxide solution was added to the reactor in a separate feed stream concurrent with the monomer feed. A pH of about 8.3 was maintained during the feed time for the monomers to the reactor.

Comparative Example CE2.1.2

The polymerization recipe and process was similar to that of E2.1, except that 8.0 g of sodium carbonate was added to the t-butyl hydroperoxide solution that was fed to the reactor. A pH of about 8.3 was maintained during the feed time for the monomers to the reactor.

Example 3 (E3)

BA/MMA/ROHAMERE/MAA Aqueous Emulsion Polymer Formed at a Maintained pH 17.5 g of a polystyrene seed latex (40% solids, particle diameter about 40 nanometer) and 500 g DI water were added to the reactor. The reactor was heated to 70° C. The monomers (687.1 g BA, 420.2 g MMA, 22.6 g ROHAMERE 6852

(Degussa), 11.5 g MAA) were combined with 295 g DI water and 50.8 g Rhodacal A-246L (Rhodia) and emulsified in the reactor under agitation.

An oxidizer solution was prepared by mixing 7.8 g t-butyl hydroperoxide (tBHP) in 50 g DI water while a reducer solution was prepared by dissolving 4.1 g isoascorbic acid into 80.5 g DI water. Commencing simultaneously, monomer preemulsion, tBHP and isoascorbic acid solutions and 12.1 g of a 28% ammonium hydroxide solution were fed to the reactor. The feed time for monomers and ammonium hydroxide solution was 210 minutes, while the feed time for oxidizer and reducer solutions was 10 minutes longer. The temperature of the polymerization reaction was controlled at 70° C. A pH of about 8 was maintained during the feed time for the monomers to the reactor.

After adding the oxidizer and reducer feeds, the reactor was held at 70° C. for 30 minutes.

To further reduce the amount of residual monomers, 3.6 g t-BHP and 2.1 g isoascorbic acid in aqueous solutions were fed over 60 minutes. The pH of the resulting latex was adjusted to a value in a range of about 8.5 to about 9.5 with 28% ammonium hydroxide. The solid content of the latex was about 50% by weight.

Comparative Example 3 (CE3)

BA/MMA/ROHAMERE/MAA Aqueous Emulsion Polymer Formed with pH Drift

The polymerization recipe and process is similar to that of E3, except 2.3 g sodium carbonate was also added with the seed latex and water to the reactor, and the oxidizer solution further included 0.4 g sodium bicarbonate.

Commencing simultaneously, monomer preemulsion, oxidizer and reducer solutions were fed to the reactor over 210 minutes and 220 minutes, respectively. The temperature was controlled at 70° C. The pH of the reactor content exhibits a downward drift during the course of the polymerization reaction. After adding the oxidizer and reducer feeds, the reactor was held at 70° C. for 30 minutes.

To further reduce the amount of residual monomers, 3.6 g t-BHP and 2.1 g isoascorbic acid in aqueous solutions were fed over 60 minutes. The pH of the resulting latex was adjusted to a value in a range of about 8.5 to about 9.5 with 28% ammonium hydroxide. The solid content of the latex was about 50% by weight.

Example 4 (E4)

BA/STY/ROHAMERE/MAA Aqueous Emulsion Polymer Formed at a Maintained pH 17.5 g of a polystyrene seed latex (40% solids, particle diameter about 40 nanometer) and 500 g DI water were added to the reactor. The reactor was heated to 70° C. The monomers (685 g BA, 422.3 g STY, 22.6 g ROHAMERE 6852 (Degussa), 11.5 g MAA) were combined with 295 g DI water and 50.8 g RHODACAL A-246L (Rhodia) and emulsified in the reactor under agitation.

An oxidizer solution was prepared by mixing 7.6 g t-butyl hydroperoxide (tBHP) in 50 g DI water while a reducer solution was prepared by dissolving 4.1 g isoascorbic acid into 80.5 g DI water. Commencing simultaneously, monomer preemulsion, tBHP and SMBS solutions and 10.1 g of a 28% (by weight) ammonium hydroxide solution were added to monomer mixture by separate feed streams. The feed time for monomers and 28% ammonium hydroxide solution was 210 minutes, while the feed time for oxidizer and reducer solutions was 10 minutes longer. The temperature of the polymerization reaction was controlled at 70° C. A pH of about 7.2 was maintained during the entire polymerization reaction. After adding the oxidizer and reducer solution feeds, the reactor was held at 70° C. for 30 minutes.

To further reduce the amount of residual monomers, 3.6 g t-BHP and 2.1 g isoascorbic acid in aqueous solutions were fed over 60 minutes. The pH of the resulting latex was adjusted to a value in a range of about 8.5 to about 9.5 with 28% ammonium hydroxide. The solid content of the latex was about 50% by weight.

Comparative Example 4 (CE4)

BA/STY/ROHAMERE/MAA Aqueous Emulsion Polymer Formed with pH Drift

The polymerization recipe and process is similar to that of E4, except 2.3 g sodium carbonate was also added with the seed latex and water to the reactor, and the oxidizer solution further included 0.4 g sodium bicarbonate.

Commencing simultaneously, monomer preemulsion, oxidizer and reducer solutions were fed to the reactor over 210 minutes and 220 minutes, respectively. The temperature of the polymerization reaction was controlled at 70° C. The pH of the reactor content exhibits a downward drift during the course of the polymerization reaction. After adding the oxidizer and reducer solution feeds, the reactor was held at 70° C. for 30 minutes.

To further reduce the amount of residual monomers, 3.6 g t-BHP and 2.1 g isoascorbic acid in aqueous solutions were fed over 60 minutes. The pH of the resulting latex was adjusted to a value in a range of about 8.5 to about 9.5 with 28% ammonium hydroxide. The solid content of the latex was about 50% by weight.

Example 5 (E5)

BA/STY/ROHAMERE/MAA Aqueous Emulsion Polymer Formed at a Maintained pH 17.5 g of a polystyrene seed latex (40% solids, particle diameter about 40 nanometer) and 500 g DI water were added to the reactor. The reactor was heated to 70° C. The monomers (685 g BA, 422.3 g MMA, 22.6 g ROHAMERE 6852 (Degussa), 11.5 g MAA) were combined with 295 g DI water and 50.8 g RHODACAL A-246L (Rhodia) and emulsified in the reactor under agitation.

An oxidizer solution was prepared by mixing 15.3 g sodium persulfate in 50 g DI water, while a reducer solution was prepared by dissolving 5.1 g sodium metabisulfite (SMBS) into 80.5 g DI water. Commencing simultaneously, monomer preemulsion, sodium persulfate and SMBS solutions and 16.2 g of a 28% (by weight) ammonium hydroxide solution were added to monomer mixture by separate feed streams. The feed time for monomers and 28% ammonium hydroxide solution was 210 minutes, while the feed time for oxidizer and reducer solutions was 10 minutes longer. The temperature of the polymerization reaction was controlled at 70° C. A pH of about 8 was maintained during the entire polymerization reaction. After adding the oxidizer and reducer solution feeds, the reactor was held at 70° C. for 30 minutes.

To further reduce the amount of residual monomers, 3.6 g t-BHP and 2.6 g SMBS in aqueous solutions were fed to the reactor over 60 minutes. The pH of the resulting latex was adjusted to a value in a range of about 8.5 to about 9.5 with the 28% ammonium hydroxide solution. The solid content of the resulting latex was about 50% by weight.

Comparative Example 5 (CE5)

BA/MMA/ROHAMERE/MAA Aqueous Emulsion Polymer Formed with pH Drift

The polymerization recipe and process is similar to that of E5, except 2.3 g sodium carbonate was also added with the seed latex and water to the reactor, and the oxidizer solution further included 0.4 g sodium bicarbonate.

Commencing simultaneously, monomer preemulsion, oxidizer and reducer solutions were fed to the reactor over 210 minutes and 220 minutes, respectively. The temperature was controlled at 70° C. The pH of the reactor content exhibits a downward drift from about 10.6 to about 4.8 during the course of the polymerization reaction. After adding the oxidizer and reducer feeds, the reactor was held at 70° C. for 30 minutes.

To further reduce the amount of residual monomers, 3.6 g t-BHP and 2.6 g SMBS in aqueous solutions were fed over 60 minutes. The pH of the resulting latex was adjusted to a value in a range of about 8.5 to about 9.5 with 28% ammonium hydroxide. The solid content of the latex was about 50% by weight.

Gel Content

Gel content of the aqueous emulsion polymer formed in E1 was assessed. As discussed, the gel content is provided as a percentage of an insoluble fraction of the aqueous emulsion polymer divided by the total dry weight of the aqueous emulsion polymer.

To determine gel content, a sample of E1 was allowed to dry to a dry polymer film. A 0.3 g sample of the dry polymer film placed in a clean extraction basket. The basket with the dry polymer film was submersed in 100 mL THF at room temperature for 48 hours. The basket was then placed in a fresh 100 mL THF at room temperature for another 48 hours. The insoluble fraction of the polymer in the basket was dried at room temperature for 10 min and then at 100±10° C. for one hour. The gel content was calculated and is expressed as a percentage of an insoluble fraction of the aqueous emulsion polymer over the total dry weight of the aqueous emulsion polymer.

Molecular weights (Mn and Mw) of the soluble polymers were measured by GPC using polystyrene of known molecular weight as standards.

Table 1 shows that the aqueous emulsion polymers of the present disclosure yielded relatively high gel content, which is an indication of higher degree of crosslinking.

TABLE 1

Gel content and molecular weight for Aqueous Emulsion Polymers of E1 and CE1

|     |       | Gel (%) | $M_n$ | $M_w$ |
| --- | ----- | ------- | ----- | ----- |
| E1  | Run 1 | 65.3    | 34538 | 77908 |
|     | Run 2 | 65.8    | 28142 | 63861 |
| CE1 | Run 1 | 54.8    | 37712 | 88446 |
|     | Run 2 | 54.3    | 38046 | 90297 |

Coating Composition and Scrub Resistance and Wet Adhesion Evaluation

The aqueous emulsion polymers of Examples E1, E2.1-E2.4, E3, E4, E5 and Comparative Examples CE1, CE3, CE4, CE5 were formulated into three different coating compositions (24PVC, 44PVC and 65PVC, provided below) and tested for both scrub resistance and wet adhesion properties.

The coating compositions had the formulas provided in Table 2:

TABLE 2

Coating Composition Formulas

| Ingredient | 24PVC Formulation Pounds-Gallons | 44PVC Formulation Pounds-Gallons | 65PVC Formulation Pounds-Gallons |
| --- | --- | --- | --- |
| Grind Components | | | |
| DI Water | 231.1-27.70 | 231.1-27.70 | 339.8-40.80 |
| ER4400 (The Dow Chemical Company) | 5.0-0.40 | 5.0-0.40 | 6.5-0.60 |
| Propylene Glycol | 10.0-1.20 | 10.0-1.20 | 10.0-1.20 |
| Colloid 226-35 (The Dow Chemical Company) | 7.0-0.70 | — | — |
| KTPP (Rhodia) | 1.5-0.10 | — | — |
| Tamol 1124 (Rohm & Haas) | — | 9.0-0.90 | 9.0-0.90 |
| Triton CF-10 (The Dow Chemical Company) | 2.5-0.30 | 2.5-0.30 | 2.5-0.30 |
| Colloid 643 (Rhodia) | 1.0-0.10 | 1.0-0.10 | 1.0-0.10 |
| Ammonium Hydroxide, 28% | 1.0-0.10 | 1.0-0.10 | 1.0-0.10 |
| TiPure R-706 (E. I. DuPont de Nemours) | 225.0-6.80 | 225.0-6.80 | 145.0-4.40 |
| Minex 4 (Unimin) | — | 170.0-7.80 | 250.0-11.50 |
| Optiwhite (Burgess) | — | 50.0-2.70 | 75.0-4.10 |
| Polygloss 90 (Huber) | 25.0-1.20 | — | — |
| Letdown Components | | | |
| Aqueous Emulsion Polymers (E1, E2.1-E2.4, E3-E5 and CE1-CE5), 50% Total Solids | 425.0-48.02 | 423.9-47.90 | 202.9-22.80 |
| DI Water | 97.0-11.63 | 50.0-6.00 | 65.6-7.90 |
| RM 2020 (Rohm & Haas) | 10.0-1.14 | 7.0-0.80 | 7.0-0.80 |
| Rhodoline 643 (Rhodia) | 1.5-0.21 | 1.5-0.21 | 1.5-0.20 |
| Ammonium Hydroxide | 2.0-0.26 | 2.0-0.26 | 2.0-0.30 |
| Totals | 1044.6-99.86 | 1189.0-103.2 | 1118.8-96.0 |
| Weight Solids, % | 47.6 | 56.4 | 52.5 |
| Volume Solids, % | 34.1 | 39.7 | 33.6 |
| Viscosity (KU) | 95-100 | 95-100 | 95-100 |
| PVC, % | 24.2 | 43.7 | 65.3 |
| VOC, g/L | 49.4 | 30 | 37 |

The grind substances listed in Table 2 were ground for 45 minutes to 1 hour (depending on viscosity) in a high speed COWLES mixer. The letdown substances were then blended with the grind substances using an overhead mixer to form the coating compositions.

The scrub resistance of the coating compositions was tested according to ASTM D-2486-79 using a GARDCO scrub machine and a LENETA SC-2 standardized scrub medium. The coating compositions were applied with a film applicator to gloss alkyd scrub panels with a wet thickness of about 0.18 millimeters (7 mils). The films were dried in a climate-controlled room (50% Relative Humidity and 23° C.) for 7 days before the scrub test.

The wet adhesion of the coating compositions was tested according to ASTM D-6900-03. The coating compositions were applied with a film applicator to gloss alkyd scrub panels with a wet thickness of about 0.18 millimeters (7 mils). The films were dried in a climate-controlled room (50% Relative Humidity and 23° C.) for 4 hours before the wet adhesion test. The wet adhesion test was then conducted using a GARDCO scrub machine and a LENETA SC-2 standardized scrub medium.

With respect to the effect of pH on scrub resistance, it was found that there was an improvement in scrub resistance for coating compositions having aqueous emulsion polymers formed at a pH of greater than about 8 using a continuous addition of ammonium hydroxide as the base. FIG. 1 illustrates the scrub resistance performance of coating compositions formulas 26PVC and 44PVC as a function of polymerization pH for the aqueous emulsion polymers of examples E2.1 through E2.3.

Figure 2:
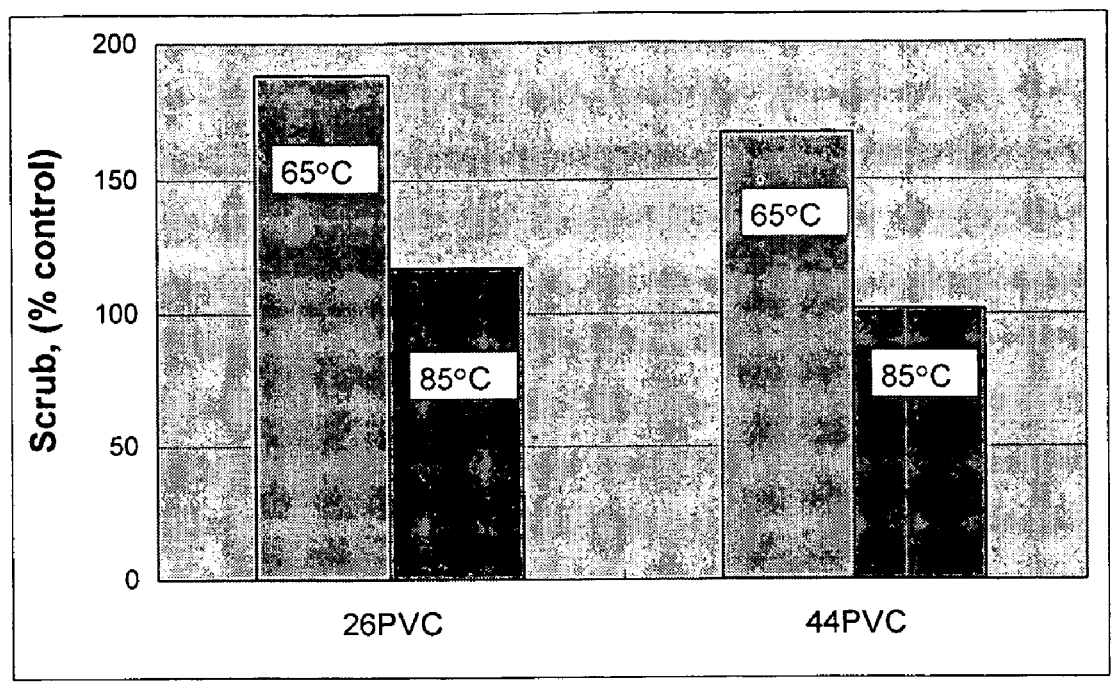
FIG. 2 is a graph illustrating the effect of polymerization temperature for an aqueous emulsion polymer on scrub resistance of a coating composition that includes the aqueous emulsion polymer.

FIG. 2 demonstrates the effect of reaction temperature of the aqueous emulsion polymers of examples E2.2 and E2.4 on the scrub resistance properties of coating compositions 26PVC and 44PVC formed therefrom. As illustrated, for comparable formulations a lower relative polymerization reaction temperature helps to improve the scrub resistance of the coating composition. As illustrated in FIG. 2, given the comparable monomer composition, redox concentrations, ammonium hydroxide amounts, etc. aqueous emulsion polymers formed at 65° C. performed significantly better than aqueous emulsion polymers formed at 85° C. in the scrub resistance test.

Figure 3:
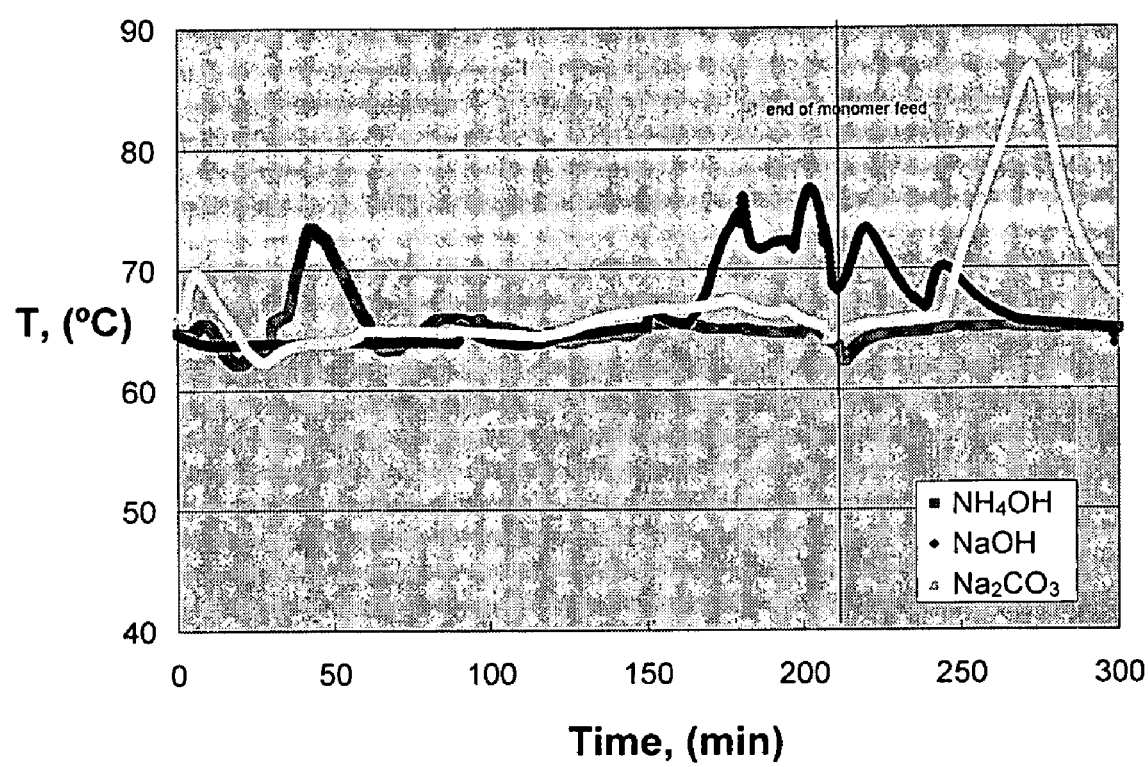
FIG. 3 is a graph illustrating reaction temperatures as a function of time for emulsion polymerization reactions whose pH was maintained with different bases.

FIG. 3 illustrates that polymerization at 65° C. was substantially inhibited when other bases like sodium carbonate and sodium hydroxide were used to maintain a similar pH of 8.3 (Example E2.1 vs CE2.1.1 and CE2.1.2). This point is demonstrated by the relatively late occurrence of the reaction exotherm for the polymerization reaction (indicating the onset of polymerization) for both sodium carbonate and sodium hydroxide as compared to ammonium hydroxide. Early temperature changes in FIG. 3 are attributed to operator manipulation of thermal controls.

Table 3 also illustrates that both the use of ammonium hydroxide as the base and the effect of pH on scrub resistance in the emulsion polymerization reaction resulted in significantly higher scrub resistance for the coating compositions. High scrub resistance is a desirable property of latex paint.

TABLE 3

Scrub Resistance of Example (E) as a % of the Comparative Example (CE)

| | E1 | CE1 | E3 | CE3 | E4 | CE4 | E5 | CE5 |
|---|---|---|---|---|---|---|---|---|
| 26PVC | 253 | 100 | 297 | 100 | 278 | 100 | 323 | 100 |
| 44PVC | 277 | 100 | 339 | 100 | 373 | 100 | 271 | 100 |
| 65PVC | 128 | 100 | 159 | 100 | 112 | 100 | 156 | 100 |

With respect to the wet adhesion test, the coating compositions (24PVC, 44PVC and 65PVC) containing the example aqueous emulsion polymers (E1, CE1, E3, CE3, E4, CE4, E5, CE5) had 100% film remaining after 3000 scrub cycles in the wet adhesion test. So, for the coating compositions containing the aqueous emulsion polymer formed according to the present disclosure (e.g., E1, E3, E4, and E5) there was a significant improvement in scrub resistance while maintaining comparable wet adhesion of the aqueous coating composition. This result in comparison to coating compositions containing aqueous emulsion polymers formed in conventional manners (e.g., CE1, CE3, CE4, and CE5) goes against a traditionally held understanding that creating improvements in wet adhesion compromises the scrub resistance of the coating composition. In contrast, the present disclosure allows for aqueous emulsion polymers that not only improve scrub resistance of a coating composition, but also help to maintain the wet adhesion properties of the coating composition in which they are used.

The complete disclosures of all patents, patent applications including provisional patent applications, publications, and electronically available material cited herein or in the documents incorporated herein by reference. The foregoing detailed description and examples have been provided for clarity of understanding only. No unnecessary limitations are to be understood therefrom. The embodiments of the disclosure are not limited to the exact details shown and described; many variations will be apparent to one skilled in the art and are intended to be included within the disclosure defined by the claims.

What is claimed is:

1. A method of preparing an aqueous emulsion polymer, comprising the steps of:
   conducting an emulsion polymerization reaction with one or more ethylenically unsaturated nonionic monomers and from 0.5 to about 5% by weight, based on dry polymer weight, of ethylenically unsaturated acid monomers to form a copolymer; and
   conducting the emulsion polymerization reaction to a conversion level of at least 60% of monomers to the copolymer at a temperature selected from a temperature range of about 20° C. to about 85° C. and at a pH value having an initial value selected from a pH range of greater than about 7 to about 10, where the pH value is maintained at, allowed to decrease, or allowed to increase from the initial pH value, in a predetermined range and the temperature is maintained in the temperature range in a predetermined range, at least until the conversion level is attained,
   without the presence of chain transfer agent.

2. The method of claim 1, where the pH value is maintained at the initial pH value in a predetermined range at least until the conversion level is attained.

3. The method of claim 1, where conducting an emulsion polymerization reaction includes conducting the emulsion polymerization reaction as a redox polymerization, where an oxidant is selected from the group consisting of t-butyl hydroperoxide, t-amyl hydroperoxide, and persulfate salts, and where a reductant is selected from the group consisting of sodium sulfoxylate formaldehyde, alkali metal and ammonium salts of sulfur-containing acids, acetone bisulfite, ascorbic acid, and isoascorbic acid.

4. The method of claim 1, where conducting an emulsion polymerization reaction includes conducting the emulsion polymerization reaction with from 1% to about 5% by weight, based on dry polymer weight, of an adhesion promoting monomer to form the copolymer.

5. The method of claim 1, where conducting an emulsion polymerization reaction includes conducting the emulsion polymerization reaction with from 0 to about 10% by weight, based on dry polymer weight, of an acetoacetate containing monomer to form the copolymer.

6. The method of claim 1, where conducting the emulsion polymerization reaction to a conversion level of at least 60% of monomers to the copolymer includes selecting the initial value from a pH range of about 8 to about 10.

7. The method of claim 1, where conducting the emulsion polymerization reaction to a conversion level of at least 60% of monomers to the copolymer includes continuously adding ammonium hydroxide to keep the pH value in the pH range at least until the conversion level is attainted.

8. The method of claim 1, where conducting the emulsion polymerization reaction to a conversion level of at least 60% includes conducting the emulsion polymerization reaction at a temperature selected from a temperature range of about 50° C. to about 70° C.

9. An aqueous emulsion polymer prepared by the method of claim 1.

10. The aqueous emulsion polymer of claim 9, where the aqueous emulsion polymer has a Tg of −50° C. to 20° C.

11. The aqueous emulsion polymer of claim 9, where the aqueous emulsion polymer has a gel content of at least 50% by weight of the aqueous emulsion polymer.

12. The aqueous emulsion polymer of claim 9, where the aqueous emulsion polymer has a gel content of at least 65% by weight of the aqueous emulsion polymer.

13. An aqueous coating composition comprising the aqueous emulsion polymer of claim 9.

14. The aqueous coating composition of claim 13, where the aqueous coating composition has a pigment volume concentration (PVC) of 0% to about 85%.

15. The aqueous coating composition of claim 13, where the aqueous coating composition contains less than 50 grams of a volatile organic compound per Liter of the aqueous coating composition.

16. The aqueous coating composition of claim 13, where the aqueous coating composition does not include a coalescing aid.

17. The aqueous coating composition of claim 13, where the aqueous coating composition has a minimum film forming temperature of 10° C. or less.

18. A method of providing a dry coating, comprising the steps of:
    providing an aqueous coating composition that includes an aqueous emulsion polymer having a gel content of at least 50% by weight of the aqueous emulsion polymer, said aqueous emulsion polymer formed by:
        conducting an emulsion polymerization reaction with one or more ethylenically unsaturated nonionic monomers and from 0.5 to about 5% by weight, based on dry polymer weight, of ethylenically unsaturated acid monomers to form a copolymer; and
        conducting the emulsion polymerization reaction to a conversion level of at least 60% of monomers to the copolymer at a temperature selected from a temperature range of about 20° C. to about 85° C. and at a pH value having an initial value selected from a pH range of greater than about 7 to about 10, where the pH value is maintained at, allowed to decrease, or allowed to increase from the initial pH value, in a predetermined range and the temperature is maintained in the temperature range in a predetermined range, at least until the conversion level is attained and without the presence of chain transfer agent;
    applying the aqueous coating composition to a substrate; and
    drying the aqueous coating composition applied to the substrate.

19. The method of claim 18, where the pH value is maintained at the initial pH value in a predetermined range at least until the conversion level is attained.

20. The method of claim 18, where the aqueous coating composition has a pigment volume concentration (PVC) of 0% to about 85%.

21. The method of claim 18, where the aqueous coating composition has a minimum film forming temperature of 10° C. or less.

22. The method of claim 18, where the aqueous coating composition does not include a coalescing aid.

* * * * *